(12) United States Patent
Freche et al.

(10) Patent No.: US 10,496,331 B2
(45) Date of Patent: Dec. 3, 2019

(54) HIERARCHICAL RESOURCE TREE MEMORY OPERATIONS

(71) Applicant: VMware, Inc., Palo Alto, CA (US)

(72) Inventors: Julien Freche, Mountain View, CA (US); Kiran Tati, Fremont, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/830,850

(22) Filed: Dec. 4, 2017

(65) Prior Publication Data

US 2019/0171390 A1 Jun. 6, 2019

(51) Int. Cl.
*G06F 3/06* (2006.01)
*G06F 9/455* (2018.01)

(52) U.S. Cl.
CPC .......... *G06F 3/0659* (2013.01); *G06F 3/0604* (2013.01); *G06F 3/0619* (2013.01); *G06F 3/0631* (2013.01); *G06F 3/0683* (2013.01); *G06F 2009/45583* (2013.01)

(58) Field of Classification Search
CPC ....... G06F 9/45533; G06F 2009/45583; G06F 9/5001; G06F 9/5016; G06F 9/5022
See application file for complete search history.

(56) References Cited

U.S. PATENT DOCUMENTS

| | | | |
|---|---|---|---|
| 5,063,504 A | 11/1991 | Jordan | |
| 6,760,306 B1 | 7/2004 | Pan et al. | |
| 6,799,208 B1 | 9/2004 | Sankaranarayan et al. | |
| 7,058,947 B1 | 6/2006 | Raja et al. | |
| 2006/0190482 A1* | 8/2006 | Kishan | G06F 9/485 |
| 2009/0100435 A1 | 4/2009 | Papaefstathiou et al. | |
| 2011/0138147 A1* | 6/2011 | Knowles | G06F 9/5016 |
| | | | 711/170 |
| 2011/0314246 A1* | 12/2011 | Miller | G06F 3/0613 |
| | | | 711/170 |
| 2013/0046951 A1 | 2/2013 | Jones | |
| 2015/0100968 A1* | 4/2015 | Bieswanger | G06F 9/5011 |
| | | | 718/104 |

* cited by examiner

*Primary Examiner* — Edward J Dudek, Jr.
*Assistant Examiner* — Andrew Russell
(74) *Attorney, Agent, or Firm* — Patterson + Sheridan, LLP (57) ABSTRACT

Hierarchical resource tree memory operations can include receiving, at a memory scheduler, an indication of a proposed modification to a value of a memory parameter of an object represented by a node of a hierarchical resource tree, wherein the proposed modification is made by a modifying entity, locking the node of the hierarchical resource tree by the memory scheduler, performing the proposed modification by the memory scheduler, wherein performing the proposed modification includes creating a working value of the memory parameter according to the proposed modification, determining whether the proposed modification violates a structural consistency of the hierarchical resource tree based on the working value, and replacing the value of the memory parameter with the working value of the memory parameter in response to determining that the proposed modification does not violate a structural consistency of the hierarchical resource tree based on the working value, and unlocking the node of the hierarchical resource tree by the memory scheduler.

26 Claims, 5 Drawing Sheets

HIERARCHICAL RESOURCE TREE MEMORY OPERATIONS

BACKGROUND

A hierarchical resource tree can depict hierarchical relationships between objects using nodes. Nodes in a hierarchical tree can include parent nodes and/or child nodes that have a hierarchical relationship to a particular node. For example, a hierarchical resource tree can represent a virtual infrastructure in a datacenter. Such a tree can be displayed in a graphical user interface (GUI) used to manage datacenters, host servers (e.g., hypervisors), clusters, virtual computing instances, data stores, processes, kernel clients, and/or virtual networks. Physical resources, such as memory, can be partitioned based on the tree.

DETAILED DESCRIPTION

A hierarchical resource tree can be a visualization and/or representation of data comprising relationships, rules, states, and/or permissions of objects using nodes, parent nodes, and/or child nodes. In some cases, child nodes can have their own child nodes, those nodes can additionally have child nodes, and so on (cumulatively referred to as "descendent nodes"). Similarly, a node may have a parent node, the parent node may have its own parent node, and so on (cumulatively referred to as "ancestor nodes"). While the present disclosure makes reference to virtual computing instances (VCIs), it is noted that such reference is not to be taken in a limiting sense. Rather, a hierarchical resource tree (sometimes referred to herein simply as "tree") in accordance with the present disclosure can depict hierarchical relationships between objects. Objects can include items, entities, components, processes, etc., and are not intended to be limited to the specific examples discussed herein.

Memory can be partitioned among VCIs using a tree. In some embodiments, memory is partitioned by a user. In some embodiments, memory is partitioned without user input (e.g., though automated processes). Memory can be hierarchically partitioned based on a location of nodes in a tree. Memory can "flow" from one partition to another, if permitted by a memory scheduler (discussed further below), based on the values assigned to one or more parameters (e.g., reservation, limit, shares, etc.), discussed further below. As previously noted, a tree can include nodes, ancestor nodes, and descendent nodes (sometimes cumulatively referred to simply as "nodes"). In some embodiments, nodes may represent VCIs. Parameter values of nodes may be modified. For instance, as their memory requirement(s) evolve, a consumer may desire to modify memory reservation values, limit values, and/or share values of one or more nodes. Such a modification may be triggered while allocating memory (e.g., kernel memory), powering on a VCI, and/or admitting a new process.

A memory scheduler can ensure that the memory requirements specified or proposed by consumers are acceptable and do not violate the tree's structural consistency (e.g., ensure that the memory requirements are feasible). For instance, the memory scheduler can ensure that the relationships between parent nodes and children nodes are maintained by preventing a child node from setting a reservation greater than its parent node's limit. As referred to herein, a memory scheduler can refer generally to a device configured to (or a device executing instructions to) multiplex hardware resources among VCIs (e.g., VCIs running unmodified commodity operating systems). In some embodiments, the memory scheduler can be executed by a hypervisor (e.g., hypervisor 212, discussed below in connection with FIG. 2).

A memory provider refers to an entity that provides or manages the tree and/or the memory resources partitioned thereby. The memory provider can be considered an entity from which users contractually obtain memory.

In previous approaches, memory schedulers may employ a global lock during a memory parameter modification operation to protect the consistency of the tree and the memory requirements set by consumers. A global lock refers to a write lock applied to the entire tree (e.g., all nodes of the tree). As a consequence, memory modification operations may be done sequentially (one at a time). However, for example, if a computing device is powering on thousands of VCIs, a global lock may cause delays of several minutes and/or freeze the computing device entirely.

In contrast, embodiments of the present disclosure can perform parameter modification operations in parallel. Further, embodiments of the present disclosure can perform these operations in parallel while maintaining structural consistency (on a per-node basis) and consistency of data in the tree. Parallel operations, rather than sequential operations, can yield significant time savings and can allow continued performance where previous approaches tend to fail.

As previously discussed, a user can modify (e.g., set, change, etc.) values of memory parameters. For instance, a user can modify a value of a memory reservation (sometimes referred to herein as "reservation" or "min"), a limit (sometimes referred to as "max"), and/or shares for one or more nodes. Reservation refers to an amount of memory that is reserved and/or guaranteed by a memory provider (e.g., a minimum amount of guaranteed memory). Max refers to an upper limit of the amount of memory available from the provider. Shares specify a relative priority of access to the memory provided among sibling nodes, such that more shares equates to more prioritized access to available memory. In some embodiments, values of memory parameters can be modified without user input (e.g., automatically). The term "modifying entity," where referred to herein, is intended to refer to the sender of requests for proposed modifications to values of memory parameters. The modifying entity can be, or include, a user in some embodiments. In other embodiments, the modifying entity may be a process or device that does not involve user input in sending such a request.

An amount of reserved memory at a node depends not only on the memory reserved at that node, but also on its descendants' reservation. For example, if the reservation value of a node I is zero and it has two children nodes, c1 and c2, having reservations of 20 and 10, respectively, the effective reservation of I is 30. Thus, even though no reservation is specifically set for I, the scheduler reserves memory for I to satisfy the reservations of the descendants of I. The effective reservation of a node, which may be defined as the maximum of the reservation of the node or the sum of the reservations of its descendent nodes, is discussed further below. In some embodiments, the sum of the reservations of a node's descendent nodes may be referred to as "childMin."

Modifying shares may be relatively straightforward in that an existing value can be replaced with a new one without violating the structural consistency of the tree. However, modifying max and min may be complicated by the structural consistency of the tree. For instance, in some embodiments, modifying max may not be allowed by the memory scheduler if it would limit a previously allowed configuration. If a descendent node has a large reservation, any ancestor may be prevented by the memory scheduler from setting a max value that is less than that reservation because the reservation was contractually guaranteed to the consumer by the provider. Thus, a proposed modification may need to be verified by the memory scheduler to ensure that it meets the guarantee. Modifying a node's reservation may involve the memory scheduler determining that there is sufficient memory left to reserve while also enforcing a previously set max on the node's ancestors. Embodiments of the present disclosure can allow the performance of these operations to modify memory parameters on multiple nodes simultaneously, in parallel. As opposed to previous approaches where such goals as preserving the tree structure and preserving admission parameters are supplied by a global lock, embodiments herein can employ a per-node lock enabling enhanced scalability and performance over previous approaches.

As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

VCIs, as referred to herein, cover a range of computing functionality. VCIs may include virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

Figure 1:
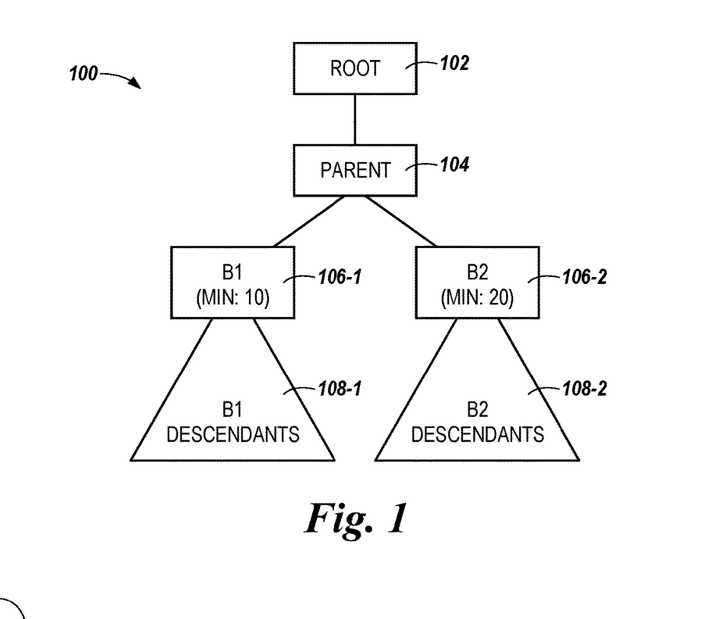
FIG. 1 is a diagram of an example of a hierarchical resource tree according to one or more embodiments of the present disclosure.

FIG. 1 is a diagram of an example of a hierarchical resource tree 100 according to one or more embodiments of the present disclosure. The tree 100 can be stored by a hypervisor, in some embodiments. One or more aspects of the tree 100 can be operated on or modified by a memory scheduler, as described herein, which may be executed by the hypervisor. The tree 100 includes a root node 102, a parent node 104, and two sibling nodes, a node B1 106-1 and a node B2 106-2. Relationships between the nodes illustrated in the tree 100 can be seen based on their placement in the tree 100. For instance, the root node 102 is a parent node of the parent node 104, which in turn is a parent node of the nodes B1 106-1 and B2 106-2. Thus, the root node 102 and the parent node 104 are each ancestor nodes of the nodes B1 106-1 and B2 106-2. The node B1 106-1 has a plurality of descendent nodes 108-1, which may be child nodes, grandchild nodes, etc., and which are not individually enumerated in FIG. 1. The node B2 106-2 has a plurality of descendent nodes 108-2, which may be child nodes, grandchild nodes, etc., and which are not individually enumerated in FIG. 1. For B1's descendent nodes 108-1, ancestor nodes include the node B1, the parent node 104, and the root node 102 (but not the node B2 106-2). For B2's descendent nodes 108-2, ancestor nodes include the node B2, the parent node 104, and the root node 102 (but not the node B1 106-1). Thus, node B1 106-1 (and its descendants 108-1) and node B2 106-2 (and its descendants 108-2) can be considered to be independent sub trees of the tree 100.

The tree 100 provides illustration of why global locks used in previous approaches can be avoided by embodiments herein. For instance, because node B1 106-1 and node B2 106-2 are independent sub trees, increasing reservation on the B1's descendants 108-1 or B2's descendants 108-2 can be independent operations, unless the increase crosses the divide between B1 106-1 and B2 106-2 while traversing towards the root node 102. Assume that node B1 106-1 has a first reservation value (10), node B2 106-2 has a second reservation value (20), and none of B1's descendants 108-1 nor B2's descendants 108-2 have reservation values. Increasing the reservation of one of B1's descendants 108-1 up to 10 is independent from increasing the reservation (to any size) of one of B2's descendants 108-2. The operation of increasing the reservation of one of B1's descendants 108-1 can be said not to cross B1 106-1 because it does not increase the reservation beyond that of B1 106-1.

To further simplify, assume that neither node B1 106-1 nor node B2 106-2 have a set reservation. Setting a reservation on any of B1's descendants 108-1 or B2's descendants 108-2 can independently operate until reaching the common ancestor for both the nodes B1 106-1 and B2 106-2, which is the parent node 104. Such a scenario may occur when two VCIs power on and are carrying out admission control for memory, for instance. Embodiments herein can exploit this independence and run these operations in parallel, rather than in series, by only locking those node(s) upon which operations are being performed instead of applying a global lock.

Figure 2:
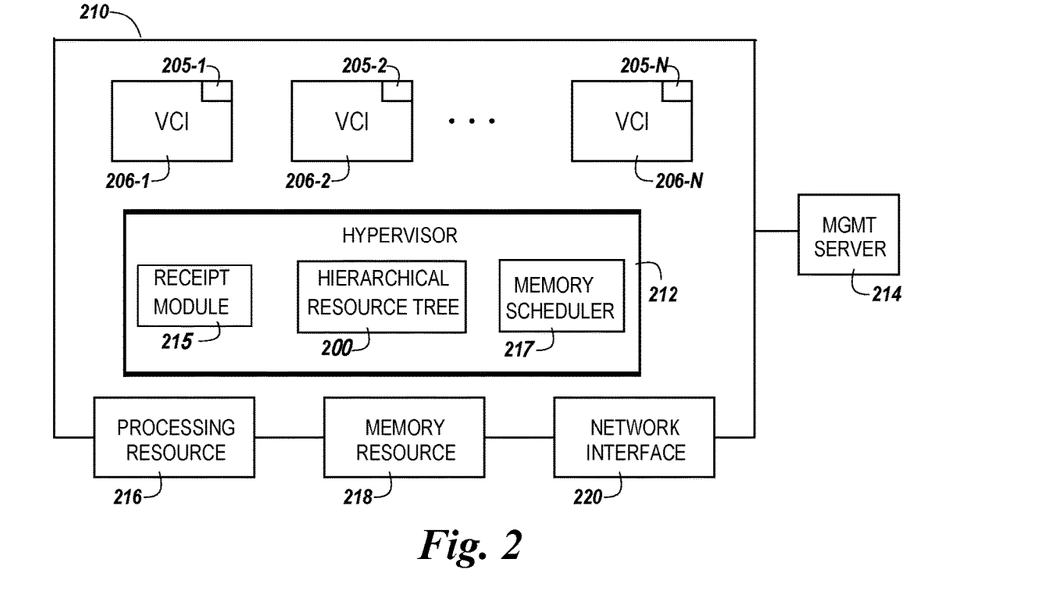
FIG. 2 is a diagram of a host for hierarchical resource tree memory operations according to the present disclosure.

FIG. 2 is a diagram of a host for hierarchical resource tree memory operations according to the present disclosure. The host 210 can include processing resources 216 (e.g., a number of processors), memory resources 218, and/or a network interface 220. Memory resources 218 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 218 may comprise primary and/or secondary storage.

The host 210 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 210 can incorporate a hypervisor 212 that can execute a number of VCIs 206-1, 206-2, . . . , 206-N. The hypervisor 212 can store a hierarchical resource tree 200. The hypervisor 212 can execute a receipt module 215 and a memory scheduler 217. The receipt module 215 can be configured to receive an indication of a proposed modification to a value of a memory parameter of an object represented by a node of the hierarchical resource tree 200. The modification can be proposed by a modifying entity, for instance, as described herein. The memory scheduler 217 can be configured to perform a number of functions, such as those discussed in more detail in connection with FIGS. 3-7. For example, the memory scheduler 217 can perform the proposed modification or determine that the proposed modification violates a structural consistency of the hierarchical resource tree 200.

The VCIs 206 can be provisioned with processing resources 216 and/or memory resources 218 and can communicate via the network interface 220. The processing resources 216 and the memory resources 218 provisioned to the VCIs 206 can be local and/or remote to the host 210. For example, in a software defined data center, the VCIs 206 can be provisioned with resources that are generally available to the software defined data center and are not tied to any particular hardware device. By way of example, the memory resources 218 can include volatile and/or non-volatile memory available to the VCIs 206. The VCIs 206 can be moved to different hosts (not specifically illustrated), such that different hypervisors manage the VCIs 206. In some embodiments, a VCI among the number of VCIs can be a master VCI. For example, VCI 206-1 can be a master VCI, and VCI 206-2, . . . , 206-N can be slave VCI.

In some embodiments, a management server 214 (MGMT SERVER 214) can be configured to manage one or more aspects of the host 210. For instance, the management server 214 can allocate resources to the plurality of VCIs 206 and/or monitor the resources allocated to the VCIs 206. For example, the management server 214 can be configured to modify resources that are allocated to the plurality of VCIs 206 in real time to provide resources from a pool of computing resources.

Figure 3:
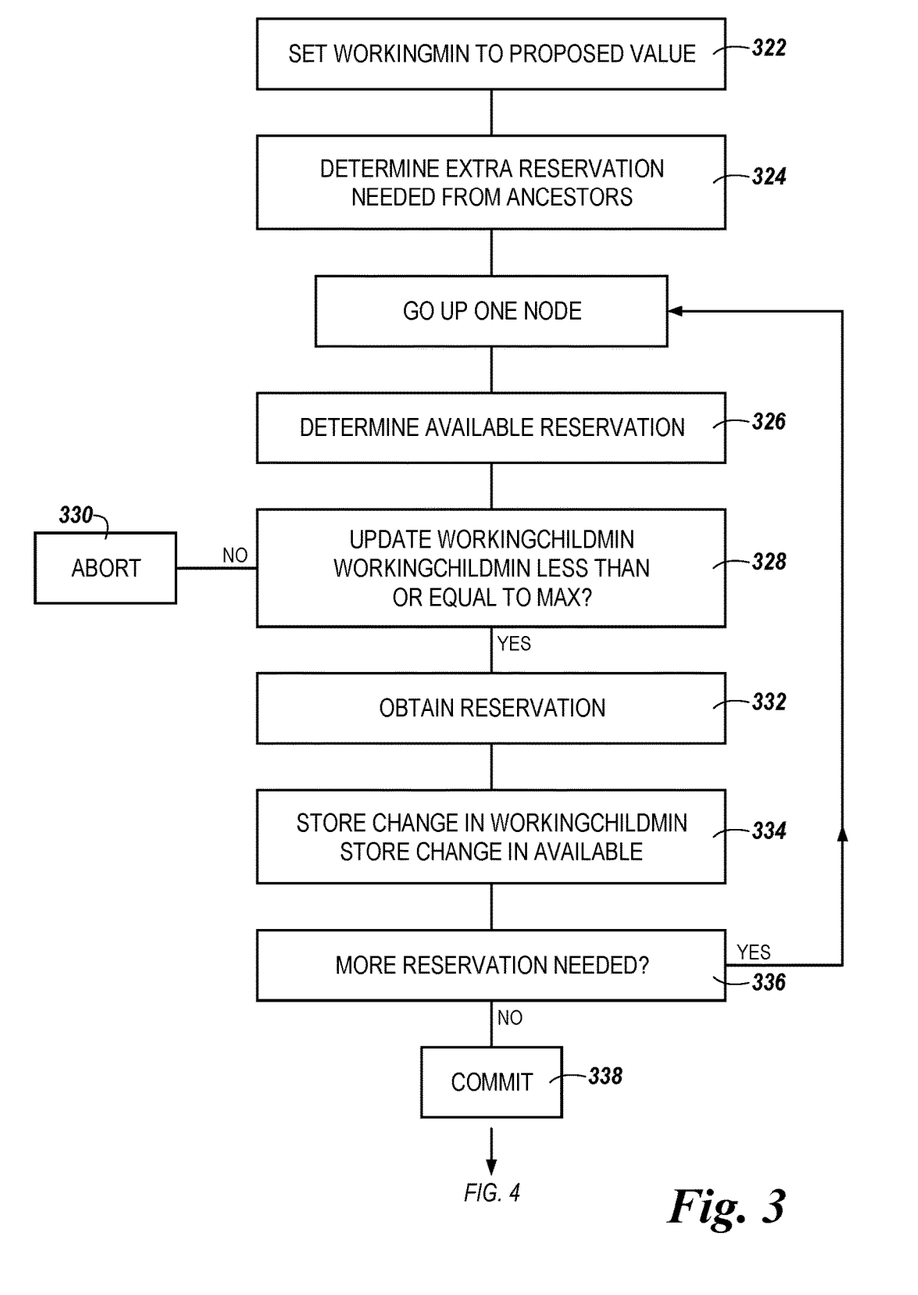
FIG. 3 is a flow chart illustrating a process for increasing a reservation of a node according to the present disclosure.

FIG. 3 is a flow chart illustrating a process for increasing a reservation of a node according to the present disclosure. Generally, if a request is received (e.g., by the receipt module 215, previously discussed in connection with FIG. 2) indicating a proposed increase of a node's reservation, that reservation needs to come from one of the node's ancestor nodes based on the structure of the tree. The memory scheduler (e.g., the memory scheduler 217, previously discussed in connection with FIG. 2) can request the reservation from the node's ancestor node(s). Starting from the node for which more reservation is requested, embodiments herein can "walk up the tree" obtaining reservation from ancestor nodes until enough reservation is obtained. The walk may be taken all the way to the root node where, in some cases, reservation may still be lacking. In those cases, the increase may fail (e.g., be aborted). In some cases, one or more ancestor nodes may have a limit set that prevents the reservation increase.

When increasing a reservation, the memory scheduler can update the value of childMin for every affected ancestor node to reflect that one of their children is consuming more reservation. As previously discussed, childMin refers to the sum of the reservations of a node's descendent nodes. However, walking up the tree and updating childMin along the way is not sufficient to avoid problems because a failure may lead to a structurally inconsistent tree; a parallel operation may have already performed some determination based on a childMin that is now not possible. To address this issue, the memory scheduler can implement a reservation increase as a two-phase commit operation. The first phase (discussed primarily in connection with FIG. 3) can ensure that the reservation increase is feasible and update working (e.g., temporary and/or artificial) values to reflect that an operation is in progress or "in-flight." The second phase (discussed primarily in connection with FIG. 4) is a committing phase where the working values can be promoted to current values. In accordance with embodiments herein, the memory scheduler can apply a lock (e.g., a per-node lock) before the first phase and drop the lock (e.g., discontinue the lock) after the first phase (before the second phase begins). In some embodiments, the memory scheduler can apply the lock again at the beginning of the second phase. As further discussed below, in case of failure, the memory scheduler can carry out an abort process to discard working values that are no longer valid.

During the processes of increasing reservation, decreasing reservation, and setting a limit, the memory scheduler can determine a number of values for one or more nodes, and each node stores its own set of these values. To increase the reservation of a node, the memory scheduler can perform two updates. Min can be updated (according to the increased value) for the node that is requesting more reservation, and childMin can be updated similarly for the affected ancestor nodes of the node. Updating these values may include determining that the increase in reservation is feasible such that other operations do not rely on incorrect values. The memory scheduler can create and/or modify working values (e.g., proposals) in order to determine if operations are feasible. WorkingMin can be created, which refers to a next value that min will take (e.g., following the update). WorkingChildMin can be created, which refers to a next value that childMin will take. Thus, instead of modifying min and childMin, the working values can be operated on by the memory scheduler. If the operation using the working values is feasible, then the memory scheduler can convert working values to their actual counterparts. Stated differently, the value for min can be replaced with the value for workingMin, and the value for childMin can be replaced with the value for workingChildMin. Otherwise, if a failure is encountered, the modifications to the working values can be discarded from the nodes. By not modifying actual values (e.g., min and childMin) before determining feasibility, the memory scheduler can ensure structural consistency of the tree.

The memory scheduler in accordance with embodiments herein can create a value referred to herein as "available." For instance, when traversing an ancestor and requesting more reservation from it, the memory scheduler may benefit from determining how much, if any, reservation is available at that level. Available refers to an amount of reservation that can be obtained at a given level of the tree. Available can be considered to be the difference between min and childMin. If children consume less reservation than the parent reservation, the difference in that reservation is available.

At 322, for the node that is requesting an increase in reservation, the memory scheduler can set workingMin to the new (e.g., proposed) value. At 324, the memory scheduler can determine an amount of extra reservation needed to be obtained from ancestor nodes to fulfill the requested reservation. Such a determination can be made by subtracting childMin and available from workingMin. The memory scheduler can then traverse up one node (e.g., one level of the tree to a parent node) and, at 326, determine an amount of reservation available from the parent node. At 328, the memory scheduler can update workingChildMin in the parent node and make a determination regarding whether the updated workingChildMin is still less than or equal to max for the node. If not, the operation can be aborted at 330. If so, then reservation can be obtained at 332 from the parent node to the extent that it is available and the change in workingChildMin and the change in available can be stored at 334. If more reservation is needed (e.g., the parent did not supply enough to satisfy the proposed increase) the memory scheduler can advance up the tree one more node to a grandparent node of the node and repeat a portion of the process as shown in FIG. 3. If sufficient reservation was obtained, the memory scheduler can advance to the commit phase, which is discussed in further detail in connection with FIG. 4. As previously discussed, the memory scheduler can apply a lock (e.g., a per-node lock) before the first phase and drop the lock after the first phase is complete (e.g., sufficient reservation obtained or abort).

Figure 4:
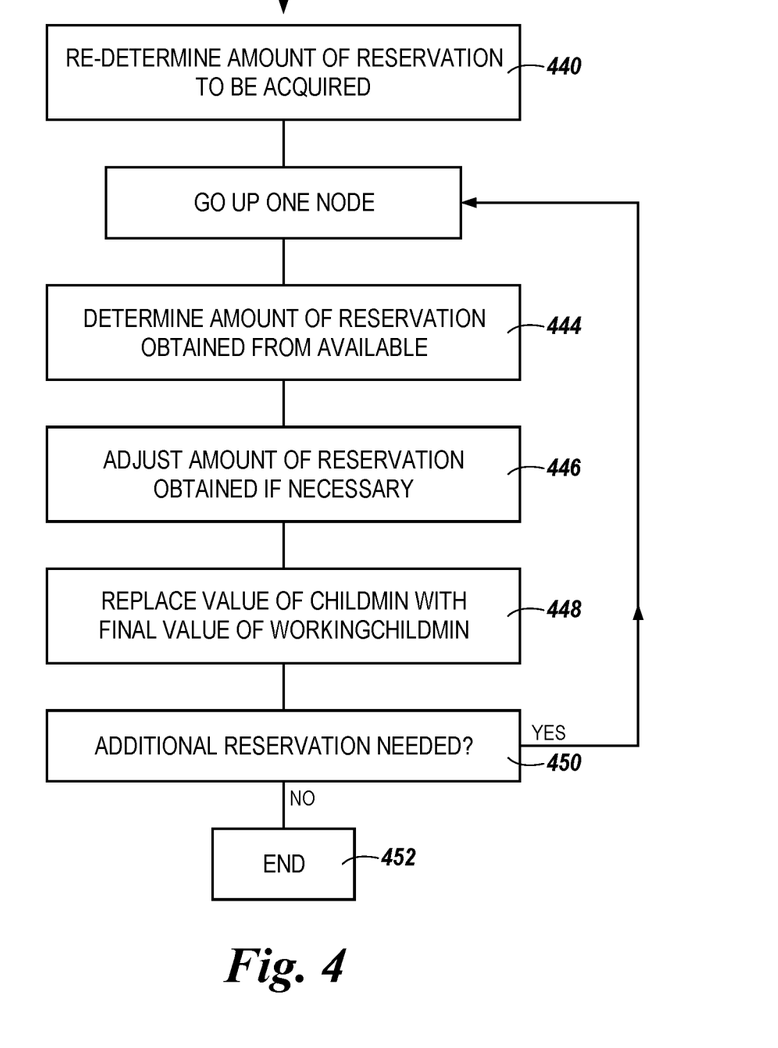
FIG. 4 is a flow chart illustrating a continued process for increasing a reservation of a node according to the present disclosure.

FIG. 4 is a flow chart illustrating a continued process for increasing a reservation of a node according to the present disclosure. Once the memory scheduler determines that the first phase (e.g., that illustrated by FIG. 3) will be a success, it can commit working values to values. However, other operations (e.g., parallel operations) may have changed one or more values used in previous determinations. The steps illustrated in FIG. 4 can be carried out for each ancestor node of the node requesting the reservation increase. As previously discussed, the memory scheduler can again apply a lock at the beginning of the second phase, in some embodiments, and drop the lock upon the completion of the second phase (e.g., abort or replacing value of childMin with final value of workingChildMin, discussed below). At 440, the memory scheduler can re-determine an amount of reservation that is to be obtained. Re-determination may be carried out because, for instance, childMin may have changed. The memory scheduler can then traverse up one node (e.g., one level of the tree to a parent node) and, at 444, determine an amount of reservation that has been obtained from available reservation at that level and compare it to the reservation needed to satisfy the increase. At 446, the memory scheduler can adjust an amount of reservation taken at that level, if necessary. In some embodiments, adjusting includes obtaining additional reservation. In some embodiments, adjusting includes releasing surplus reservation. In some embodiments, adjusting may not be carried out as the amount of reservation obtained is the amount needed to satisfy the increase. At 448, the memory scheduler can replace the value of childMin with the final value of workingChildMin. If the memory scheduler determines that additional reservation is needed at 450, it can advance up the tree one node and repeat a portion of the process as shown in FIG. 4. Otherwise, the process can end at 452.

Figure 5:
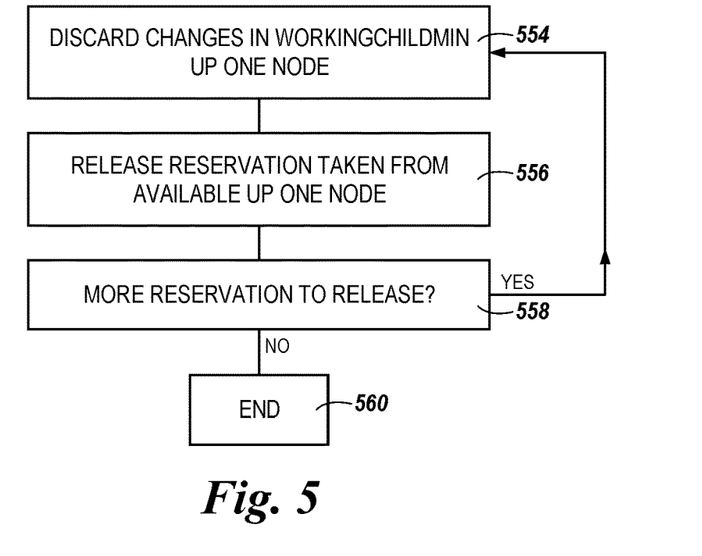
FIG. 5 is a flow chart illustrating a process for aborting an increase to a reservation of a node according to the present disclosure.

FIG. 5 is a flow chart illustrating a process for aborting an increase to a reservation of a node according to the present disclosure. Aborting can include discarding change(s) made to workingMin and releasing any extra reservation that may have been obtained. At 554, the memory scheduler can discard changes made to workingChildMin in the parent node. At 556, the memory scheduler can release reservation obtained from available in the parent. If the memory scheduler determines, at 558, that more reservation was taken than that from available in the parent, the memory scheduler can advance up the tree one node and repeat a portion of the process as shown in FIG. 5 to release the remainder of the reservation. Otherwise, the process can end at 560.

Figure 6:
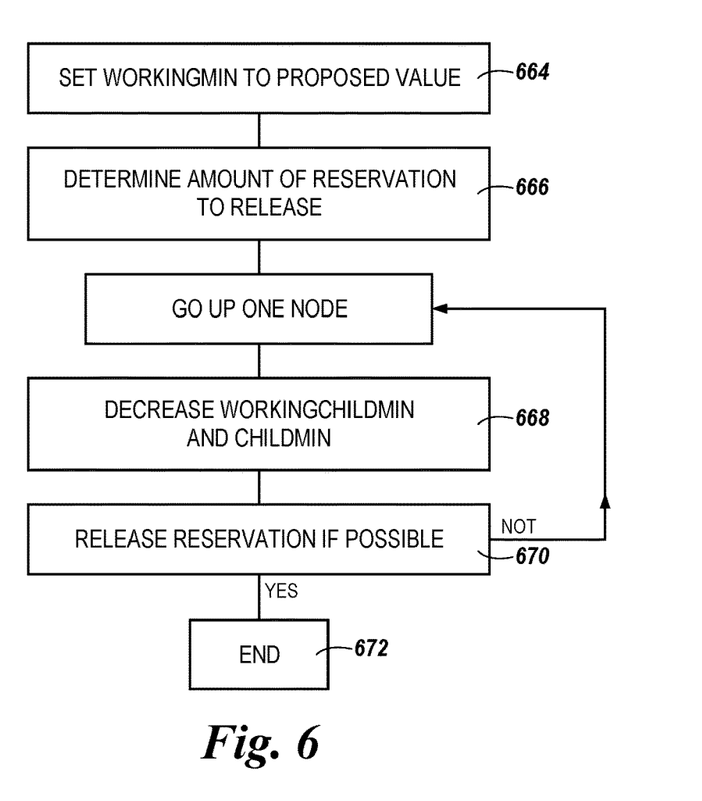
FIG. 6 is a flow chart illustrating a process for decreasing a reservation of a node according to the present disclosure.

FIG. 6 is a flow chart illustrating a process for decreasing a reservation of a node according to the present disclosure. At 664, the memory scheduler can set workingMin to the proposed (decreased) value. At 666, the memory scheduler can determine an amount of reservation to be released. The amount can be determined by subtracting workingMin and childMin from available, for instance. The memory scheduler can then traverse up one node (e.g., one level of the tree to a parent node) and, at 668, decrease workingChildMin and childMin according to the proposed decrease. At 670, the memory scheduler can release the reservation if the node can take it back (e.g., if max for the node will not be exceeded) and the process can end at 672. If the node cannot take the reservation back, the memory scheduler can advance up the tree one node and repeat a portion of the process as shown in FIG. 6.

For setting a limit (max) to a node, the memory scheduler can verify that the proposed limit is greater than or equal to workingChildMin and min. If so, the memory scheduler can apply the new limit. If not, the proposed limit may be aborted and/or rejected.

Figure 7:
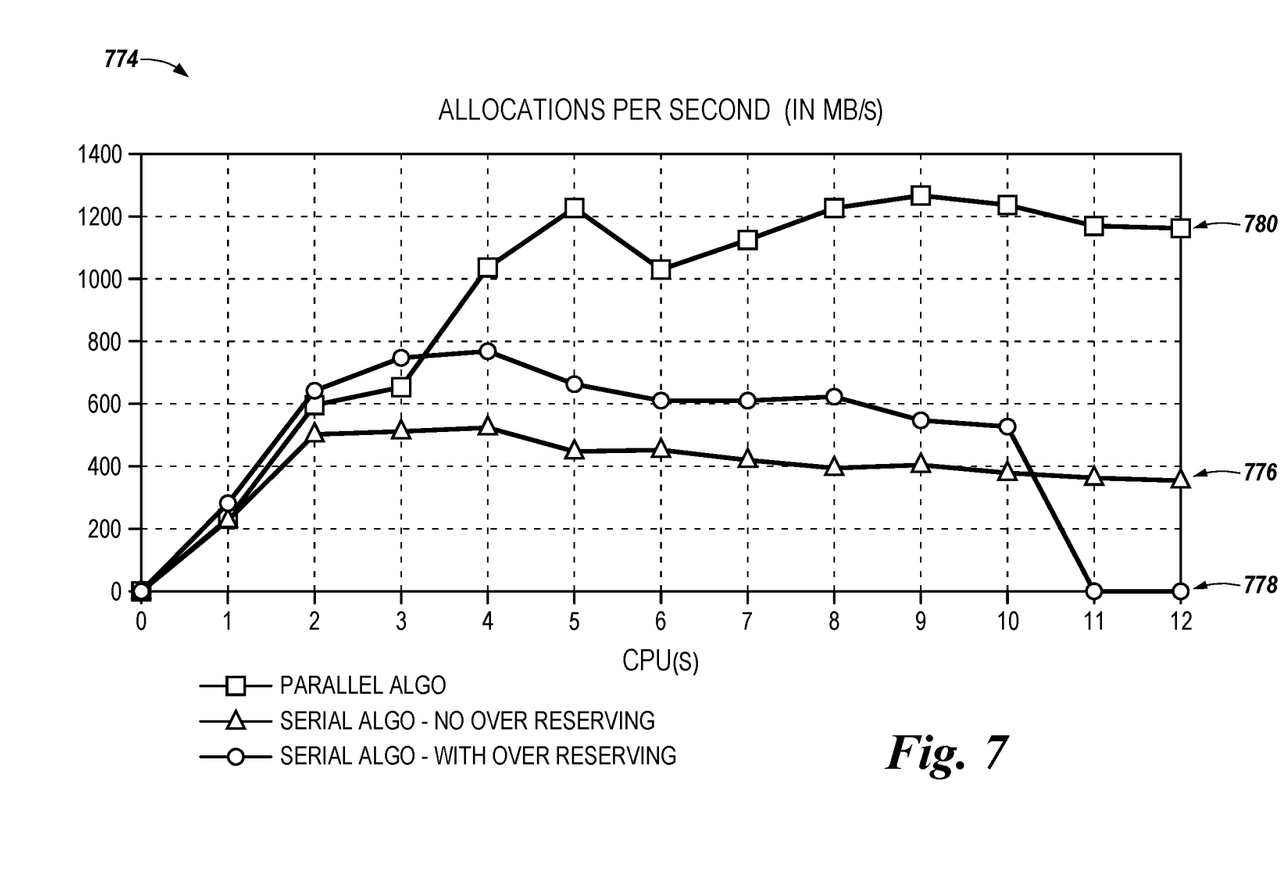
FIG. 7 is a graph illustrating an example of performance of hierarchical resource tree memory operations according to the present disclosure.

FIG. 7 is a graph 774 illustrating an example of performance (in allocations per second) of hierarchical resource tree memory operations according to the present disclosure. FIG. 7 also illustrates the respective performance of two previous approaches to hierarchical resource tree memory operations, discussed below. The workload of the example includes one kernel client per CPU which allocates and frees 256 MB one page at a time. Each kernel client operates under its own lock, only taking a read lock on the tree to perform the admission control in parallel. The example was carried out on a server having 24 GB of memory and 12 CPUs (6 cores with hyper-threading enabled).

The serial curve 776 shows the performance of a previous approach to hierarchical resource tree memory operations in the example. The over-reserving serial curve 778 shows the performance of a previous approach to hierarchical resource tree memory operations using over-reserving in the example. Over-reserving is known to those of skill in the art and refers to an optimization that over reserves memory when a client is asking for reservation with the idea that this will speed up the next allocation. Over-reserving may tend to perform (e.g., perform better) with few clients but may make the system freeze as more clients ask for memory because memory that was over-reserved is reclaimed. Approaches using over-reserving may be cost intensive (e.g., reclaiming over-reservation may be cost intensive) and involve locking the tree completely and inspecting every node in worst case scenarios. The parallel curve 780 shows the performance of one or more embodiments of the present disclosure in the example. As shown, the performance of the parallel curve 780 is up to 300% faster in the example illustrated in FIG. 7. Moreover, embodiments of the present disclosure allowed the example system to continue to operate when more than 10 clients are allocating memory, whereas the performance of the over-reserving curve 778 shows that the over-reserving serial approach froze beyond 10 clients. Also, it is noted that in the example, all kernel clients are sharing the same client, which may create some amount of lock contention at the parent level. A separate parent by kernel client, each having its own reservation, can push the benefits and performance of embodiments herein even further beyond prior approaches than what is illustrated in FIG. 7.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for hierarchical resource tree memory operation, comprising receiving, at a receipt module, an indication of a proposed modification to a value of a memory parameter of an object represented by a node of a hierarchical resource tree;
locking the node of the hierarchical resource tree by a memory scheduler;
performing the proposed modification by the memory scheduler, wherein performing the proposed modification includes:
creating a working value of the memory parameter according to the proposed modification;
determining whether the proposed modification violates a structural consistency of the hierarchical resource tree based on the working value; and
replacing the value of the memory parameter with the working value of the memory parameter in response to determining that the proposed modification does not violate a structural consistency of the hierarchical resource tree based on the working value; and
unlocking the node of the hierarchical resource tree by the memory scheduler.

2. The method of claim 1, wherein the method includes the memory scheduler locking the node of the hierarchical resource tree without locking any other nodes of the hierarchical resource tree.

3. The method of claim 1, wherein performing the proposed modification includes the memory scheduler increasing a memory reservation of the object.

4. The method of claim 1, wherein performing the proposed modification includes the memory scheduler decreasing a memory reservation of the object.

5. The method of claim 1, wherein performing the proposed modification includes the memory scheduler modifying a memory limit associated with the object.

6. The method of claim 1, wherein the method includes the memory scheduler locking the node of the hierarchical resource tree without locking a different node of the hierarchical resource tree.

7. The method of claim 1, wherein the method includes concurrently:
receiving, at the receipt module, an indication of a different proposed modification to a value of a memory parameter of a different object represented by a different node of the hierarchical resource hierarchical resource tree, wherein the different proposed modification is made by a different modifying entity;
locking the different node of the hierarchical resource tree by the memory scheduler;
performing the different proposed modification by the memory scheduler, wherein performing the different proposed modification includes:
creating a different working value of the memory parameter of the different object according to the different proposed modification;
determining that the different proposed modification does not violate a structural consistency of the hierarchical resource tree based on the different working value; and
replacing the value of the memory parameter of the different object with the different working value of the memory parameter; and
unlocking the different node of the hierarchical resource tree by the memory scheduler.

8. The method of claim 1, the method further comprising:
determining a target amount of ancestor memory reservation from one or more ancestor nodes of the node.

9. The method of claim 8, the method further comprising, subsequent to the determining the target amount of ancestor memory reservation:

determining an available memory reservation of a parent node of the node; and determining whether the available memory reservation of the parent node of the node meets or exceeds the target amount of ancestor memory reservation.

10. A non-transitory computer-readable medium having instructions stored thereon which, when executed by a processor, cause the processor to:

receive an indication of a proposed increase to a value of a memory reservation of an object represented by a node of a hierarchical resource tree;

prevent modification of the value of the memory reservation by an external source;

create a proposal having a first value equal to the memory reservation;

increase the proposal to a second value according to the proposed increase;

increase the memory reservation from the first value to the second value responsive to a determination that the proposed increase does not violate a structural consistency of the hierarchical resource tree;

abort the proposed increase and decrease the proposal from the second value to the first value responsive to a determination that the proposed increase violates the structural consistency of the hierarchical resource tree; and allow modification of the value of the memory reservation by the external source.

11. The medium of claim 10, wherein the determination that the proposed increase violates the structural consistency of the hierarchical resource tree comprises the second value being greater than a reservation limit of a different object represented by a parent node of the node.

12. A system, comprising:

a hierarchical resource tree including a plurality of nodes;

a receipt module configured to receive an indication of a proposed increase to a value of a memory reservation of an object represented by a node of the hierarchical resource tree; and a memory scheduler configured to:

create a working value of the memory reservation based on the proposed increase from the receipt module;

determine a value of a child memory reservation comprising a sum of respective memory reservations of child nodes of the node;

create a working value of the child memory reservation comprising a next value of the child memory reservation following the proposed increase;

create a working value of an available memory reservation, wherein the available memory reservation comprises a difference between the memory reservation and the child memory reservation;

determine whether the proposed increase violates a structural consistency of the hierarchical resource tree based on the working value of the memory reservation, the working value of the child memory reservation, and the working value of the available memory reservation; and replace the value of the memory reservation with the working value of the memory reservation responsive to a determination that the proposed increase does not violate the structural consistency of the hierarchical resource tree.

13. The system of claim 12, wherein the memory scheduler being configured to determine whether the proposed increase violates the structural consistency of the hierarchical resource tree includes the memory scheduler being configured to:

determine a target amount of ancestor memory reservation from one or more ancestor nodes of the node by subtracting the working value of the available memory reservation and the child memory reservation from the working value of the memory reservation;

determine an available memory reservation of a parent node of the node;

create a working value of a child memory reservation for the parent node based on the proposed increase; and determine whether the available memory reservation of the parent node of the node meets or exceeds the target amount of ancestor memory reservation.

14. The system of claim 13, wherein the memory scheduler is configured to increase the value of the memory reservation using the available memory reservation of the parent node responsive to a determination that the available memory reservation of the parent node meets or exceeds the target amount of ancestor memory reservation.

15. The system of claim 13, wherein the memory scheduler is configured to determine an available memory reservation of a parent node of the parent node of the node and determine whether the available memory reservation of the parent node of the parent node of the node meets or exceeds the target amount of ancestor memory reservation responsive to a determination that the available memory reservation of the parent node is less than the target amount of ancestor memory reservation.

16. The system of claim 15, wherein the memory scheduler is configured to increase the value of the memory reservation using the available memory reservation of the parent node of the parent node responsive to a determination that the available memory reservation of the parent node of the parent node meets or exceeds the target amount of ancestor memory reservation.

17. The system of claim 13, wherein the memory scheduler is configured to abort the proposed increase responsive to a determination that a sum of respective available memory reservations for each ancestor node of the node is less than the target amount of ancestor memory reservation.

18. The system of claim 17, wherein the memory scheduler is configured to discard the working value of the memory reservation and the working value of the child memory reservation for the parent node.

19. The system of claim 13, wherein the memory scheduler is configured to abort the proposed increase responsive to a determination that the working value of the child memory reservation for the parent node exceeds a threshold value.

20. The system of claim 19, wherein the threshold value is a maximum amount of memory reservation allowed.

21. The system of claim 19, wherein the memory scheduler is configured to discard the working value of the memory reservation and the working value of the child memory reservation for the parent node.

22. A non-transitory computer-readable medium having instructions stored thereon which, when executed by a processor, cause the processor to:

receive an indication of a proposed decrease to a value of a memory reservation of a first object represented by a node of a hierarchical resource tree;

create a working value of the memory reservation of the first object according to the proposed decrease;

determine a first value of a child memory reservation comprising a sum of respective memory reservations of objects represented by child nodes of the node according to the hierarchical resource tree;

create a working value of the child memory reservation comprising a second value of the child memory reservation following the proposed decrease;

create a working value of an available memory reservation, wherein the available memory reservation comprises a difference between the memory reservation and the child memory reservation;

determine an amount of memory to release to a second object represented by an ancestor node of the node by subtracting the working value of the memory reservation of the first object and the first value of the child memory reservation from the working value of the available memory reservation;

replace the value of the memory reservation of the first object with the working value of the memory reservation of the first object; and decrease a value of a child memory reservation for the second object and a working value of the child memory reservation for the second object by the determined amount of memory to release.

23. A non-transitory computer-readable medium having instructions stored thereon which, when executed by a processor, cause the processor to:

receive an indication of a proposed limit to a memory usage of an object represented by a node of a hierarchical resource tree;

determine a value of a child memory reservation comprising a sum of respective memory reservations of child nodes of the node according to the hierarchical resource tree;

create a working value of the child memory reservation, wherein the working value of the child memory reservation comprises a value of the child memory reservation following the proposed limit; and apply the proposed limit responsive to a determination that the proposed limit is greater than or equal to the working value of the child memory reservation.

24. The medium of claim 23, including instructions not to apply the proposed limit responsive to a determination that the proposed limit is less than or equal to a proposed reservation value of a descendent node of the node.

25. The medium of claim 24, wherein a determination whether the proposed reservation value violates a structural consistency of the hierarchical resource tree is determined concurrently with an operation being performed on a different node of the hierarchical resource tree.

26. The method of claim 8, wherein the determining the target amount of ancestor memory reservation is performed by:

subtracting the working value of the available memory reservation and the child memory reservation from the working value of the memory reservation.

* * * * *